United States Patent

Scarlata et al.

[11] Patent Number: 5,344,160
[45] Date of Patent: Sep. 6, 1994

[54] SHAFT SEALING OF STEAM TURBINES

[75] Inventors: Steven P. Scarlata, Averill Park; Adrian Missana, Scotia, both of N.Y.

[73] Assignee: General Electric Company, Schenectady, N.Y.

[21] Appl. No.: 986,573

[22] Filed: Dec. 7, 1992

[51] Int. Cl.⁵ .......................................... F16J 15/447
[52] U.S. Cl. .................................. 277/3; 277/53; 277/56; 277/58; 277/79; 415/168.2
[58] Field of Search .................. 277/53, 55, 56, 58, 277/59, 70, 71, 72 R, 78, 79, 192, 3; 415/110–112, 168.1, 168.2

[56] References Cited

U.S. PATENT DOCUMENTS

| | | |
|---|---|---|
| 1,374,520 | 4/1921 | Parsons et al. ............. 277/58 X |
| 1,562,019 | 11/1925 | Wilkinson ................. 277/58 X |
| 2,543,615 | 2/1951 | Trumpler .................. 277/53 X |
| 3,003,321 | 10/1961 | Warth ..................... 415/168.2 X |
| 3,572,733 | 3/1971 | Hampton . |
| 3,575,424 | 4/1971 | Taschenberg . |
| 3,743,303 | 7/1973 | Pope . |
| 3,792,935 | 2/1974 | Randell ................... 415/112 X |
| 4,046,388 | 9/1977 | Meyer . |
| 4,082,296 | 4/1978 | Stein . |
| 4,099,727 | 7/1978 | Weiler .................... 277/59 X |
| 4,193,603 | 3/1980 | Sood ...................... 277/53 X |
| 4,273,510 | 6/1981 | Ambrosch et al. . |
| 4,385,864 | 5/1983 | Zacherl . |
| 4,397,471 | 8/1983 | Feldman et al. . |
| 4,477,086 | 10/1984 | Feder et al. . |
| 4,557,664 | 12/1985 | Tuttle et al. . |
| 4,812,105 | 3/1989 | Heymann . |
| 4,916,892 | 4/1990 | Pope . |
| 4,978,278 | 12/1990 | Kun ....................... 415/168.2 X |
| 5,039,115 | 8/1991 | Herbert et al. ........... 277/192 X |

FOREIGN PATENT DOCUMENTS 400438  4/1966 Switzerland ................. 277/59

OTHER PUBLICATIONS

"Shaft Seals–Circumferential Seals for Use as Oil Seals," P. C. Stein 33rd Annual Meeting of ASLE, Apr. 18, 1978, Dearborn, Mich.

Primary Examiner—William A. Cuchlinski, Jr.
Assistant Examiner—Scott W. Cummings
Attorney, Agent, or Firm—Nixon & Vanderhye

[57] ABSTRACT

A shaft sealing system for a steam turbine includes at the high-pressure inlet end an outer air seal (40) and an outer steam seal (42) each comprised of segmented circumferential seals and a plurality of labyrinth seals (44, 46, 48). The low-pressure end of the turbine is provided with a segmented circumferential seal (60) substantially precluding ingress of air past the seal. The steam leaking past the inner two labyrinth seals (46 and 48) is returned to a stage of the turbine by a first leak-off pipe system (50). Air leaking past the air seal and steam leaking outwardly past the outer steam seal (42) is piped to the main condenser (58). High-pressure steam between the outer steam seal (42) and the outermost labyrinth seal (44) is piped via a second leak-off path (56) to a turbine stage downstream from the first-mentioned turbine stage.

3 Claims, 2 Drawing Sheets

SHAFT SEALING OF STEAM TURBINES

TECHNICAL FIELD

The present invention relates to a sealing system for the shaft of a steam turbine, and particularly relates to a combination of labyrinth and segmented circumferential seals for sealing the shaft of a steam turbine adjacent its high- and low-pressure ends.

BACKGROUND

The pressure boundary of a steam turbine casing is penetrated by a rotating turbine shaft in order to transmit power outside of the steam environment. Consequently, the shaft must be sealed at the points of penetration to prevent the escape of steam from the casing at locations where 'the casing pressure exceeds ambient press tire and to prevent leakage of air into the casing at locations where the casing pressure is below ambient.

Many sealing systems have been employed in the past for this purpose. For example, labyrinth-type seals have been employed about the shaft. Because the teeth of the meshing but non-contacting labyrinth seals inherently form leakage paths past the seal, labyrinth sealing systems require elaborate steam seal and vent piping subsystems normally including a steam seal regulator, a gland exhauster and a gland condenser. Typically, labyrinth seals provided at the high-pressure end of the turbine prevent high-pressure steam from escaping the turbine. At the opposite end of the turbine, labyrinth seals prevent the entry of air into the turbine low pressure or vacuum region. At turbine start-up, the labyrinth seal at the steam inlet end of the turbine functions as a vacuum seal in view of the vacuum which exists throughout the turbine. As well understood, the labyrinth seals are thus used to restrict the flow of steam and/or air along the shaft.

Even with the small clearances between the teeth of the labyrinth seals, it is necessary to control the pressure differential across the labyrinth at the high pressure end of the turbine with a stream seal regulator and gland exhauster. Thus, a seal header is conventionally maintained at a predetermined positive pressure and will either supply steam to the annulus between the seals or dump steam from the annulus, depending the pressure differential across the labyrinth seals defining the annulus. Similarly, steam under positive pressure must be supplied the shaft seals adjacent the flow outlet of the turbine, such that the labyrinth seals can effectively preclude entry of air into the turbine. Further, there is some difficulty in matching the steam's temperature supplied to the labyrinth seals to the needs of the metal at those locations.

From the foregoing, it will be appreciated that use of labyrinth seals alone for sealing turbine shafts requires extensive piping subsystems with attendant design and installation problems. The cost of such piping and its ancillary controls, valves, gland exhaustera and the like, as well as the maintenance required for that equipment indicates a need for improved shaft sealing for turbines.

DISCLOSURE OF THE INVENTION

In accordance with the present invention, there is provided a sealing system for a steam turbine rotor shaft employing a combination of labyrinth and segmented circumferential seals. More particularly, the high-pressure, steam inlet end of the steam turbine is provided with a plurality of axially spaced labyrinth seals about the shaft, together with a pair of segmented circumferential seals spaced. axially one from the other and axially outwardly of the labyrinth seals. At the opposite end of the turbine rotor shaft, there is provided a segmented circumferential seal for sealing between ambient and the low-pressure end of the turbine exhaust. Segmented circumferential seals are per se well known types of seals and characteristically have very low leakage rates. A representative example of a circumferential segmented seal is described and illustrated in U.S. Pat. No. 4,082,296, the disclosure of which is incorporated herein by reference.

By employing a series of axially spaced labyrinth seals at the high-pressure, steam inlet end of the turbine, leakage steam flowing axially outwardly past the labyrinth seals and into the annuli therebetween can be tapped off and supplied to a stage of the turbine. Similarly, the annulus between the outer steam seal and the outer labyrinth seal can be tapped off to provide steam to a second stage of the turbine, the second stage being a lower-pressure stage than the first stage. The annulus between the outer air seal and outer steam seal of the segmented circumferential seals is tapped off to supply any air and steam leakage past the respective seals to a main condenser. A segmented circumferential seal is also used as the air seal at the opposite end of the rotor shaft. The air leaking past this seal enters the exhaust of the turbine for flow to the main condenser.

The advantages of the combination labyrinth and segmented circumferential sealing system of the present invention reside in a greatly simplified piping system with lower initial and maintenance costs, due to the elimination of piping, a exhauster, a gland condenser and steam seal regulator valves. Also, the external supply of sealing steam is totally eliminated in accordance with the present invention. Significant reductions in maintenance are also obtained.

In accordance with a preferred embodiment of the invention, there is provided, in a multi-stage steam turbine having a first rotating member including a shaft, a second stationary member surrounding said first member and defining a steam flow path having a high-pressure inlet at one end of the turbine and a low-pressure outlet at its opposite end, a shaft sealing system adjacent the inlet and outlet ends of said turbine, comprising a pair of axially spaced labyrinth seals about the shaft adjacent said high-pressure inlet end and defining an annulus therebetween, a pair of axially spaced segmented circumferential seals about the shaft defining an annulus therebetween and spaced axially outwardly of the labyrinth seals, an axially outermost segmented circumferential seal of the pair of segmented circumferential seals consisting an air seal sealing between ambient and the annulus between the segmented circumferential seals, another of the pair of segmented circumferential seals constituting an outer steam seal sealing between said labyrinth seals and the annulus between the segmented circumferential seals, means connecting the annulus between the labyrinth seals and a stage of the turbine for supplying steam leaked past an axially innermost one of the pair of labyrinth seals to a stage of said turbine, and a segmented circumferential seal about shaft adjacent the outlet end of turbine for sealing between ambient and turbine exhaust flow.

Accordingly, it is a primary object of the present invention to provide a novel and improved sealing system for a steam turbine rotor shaft which greatly simplifies the seals, minimizes ancillary equipment, including piping, valves, glands, and exhausters, completely eliminates the need for external sealing steam and facilitates the maintenance of the seal system.

BEST MODE FOR CARRYING OUT THE INVENTION

Figure 1:
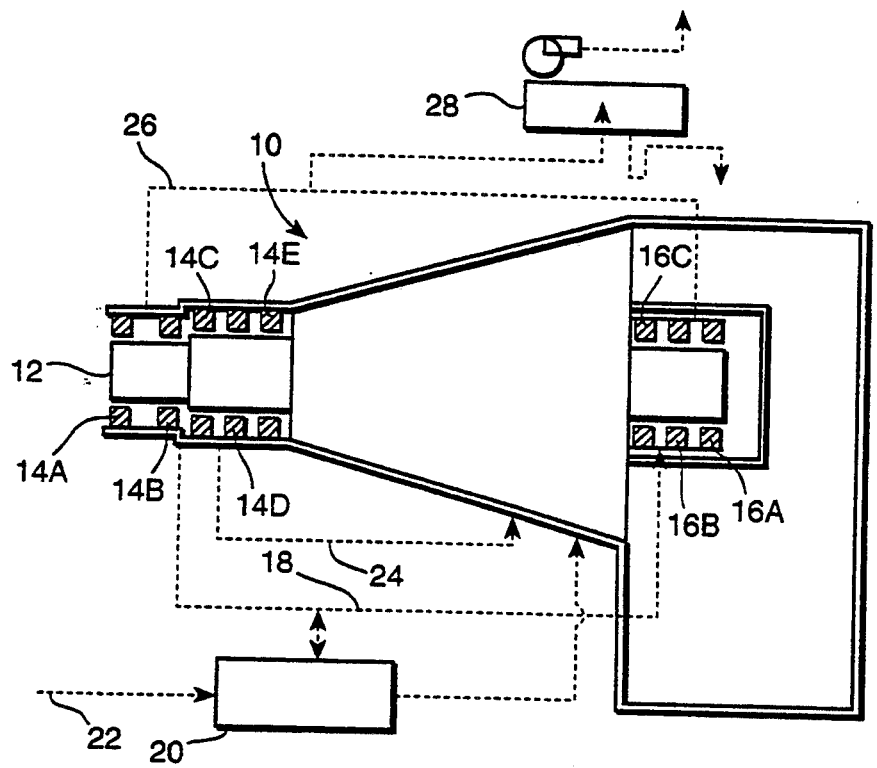
FIG. 1 is a schematic illustration of a shaft sealing system of the prior art and employing labyrinth-type seals.

Referring now to the drawings, particularly to FIG. 1, there is illustrated a conventional shaft sealing system for a condensing steam turbine using labyrinth seals or packings for the turbine rotor shaft. In this illustrated system, the steam turbine, generally indicated 10, includes a plurality of turbine stages defining with the stationary or housing members a steam path flow for driving the turbine and the turbine rotor shaft 12, the operation of the steam turbine being, of course, conventional and well understood.

In the prior art system illustrated in FIG. 1, packings are provided at the opposite ends of the rotor shaft 12, i.e., adjacent the high-pressure inlet and the low-pressure outlet ends. The packings include a plurality of labyrinth seals spaced axially one from the other. For example, as illustrated in FIG. 1, the packing at the high-pressure end about shaft 12 includes labyrinth seals 14A–E, spaced axially one from the other defining a series of axially spaced annuli between 'the seals. By appropriately piping steam to and from the annuli between these labyrinth seals, a differential pressure seal is effected. Similarly, the low-pressure outlet end of the turbine has a series of labyrinth seals 16A–C. The labyrinth seals are conventional in construction and may include the meshing teeth of the stationary and rotating shaft, which provide a tortuous path for the fluid attempting to pass through the seal, whereby the seal is effective to restrict the fluid flow. The labyrinth seals 16A–C define a pair of axially spaced annuli between the seals.

As will be appreciated from a review of 1, there is provided a steam seal feed header 18, having a steam seal regulator 20, in communication with start-up sealing steam via a line 22. As illustrated, the steam seal feed header 18 is communication with the annulus between labyrinth seals 14C and 14B. The steam seal feed header 18 is in also in communication with the annulus between labyrinth seals 16C and 16B. A first leak-off pipe 24 lies in communication with the annulus between labyrinth seals 14C and 14D and is in communication with a stage of the turbine. A steam seal vent header 26 lies in communication with the annulus between the labyrinth seals 14A and 14B and at its opposite end with the annulus between seals 16A and 16B. Header 26 lies in communication with the gland exhauster 28.

In operating this conventional shaft sealing system, the labyrinth seals at the high-pressure inlet end prevent steam from escaping to ambient while the labyrinth seals at the low-pressure outlet end of the turbine prevent air from leaking into the turbine. Thus, steam provided from steam seal header 18 to the annulus between seals 14B and 14C and leaked past seal 14B is vented by the steam seal vent header 26 in communication with the annulus between seals 14A and 14B. Leakage air past the first labyrinth seal 14A is also combined with the vented steam and vented to the gland condenser 28 via vent header 26. Leakage steam is also piped from the annulus between seals 14C and 14D for return to a later stage in the turbine. It will be appreciated that the labyrinth seal 16C faces on one side the pressure of the last turbine stage which is a very low pressure. Thus, by supplying steam at a positive pressure to the annulus between labyrinth seals and 16C, a seal is established. The steam seal vent header vents air and steam leakage past seals 16A and 16B, respectively, from the annulus between seals 16A and 16B, and thus, ambient air is prevented from leaking past the labyrinth seals 16A–C into the turbine.

The foregoing description of a conventional shaft sealing system using labyrinth packings demonstrates the extensive piping system and controls which are necessary to provide an effective shaft sealing system. The present invention greatly simplifies such packing systems, provides effective seals at substantially lower cost and eliminates any requirement for an external supply of sealing steam.

Figure 2:
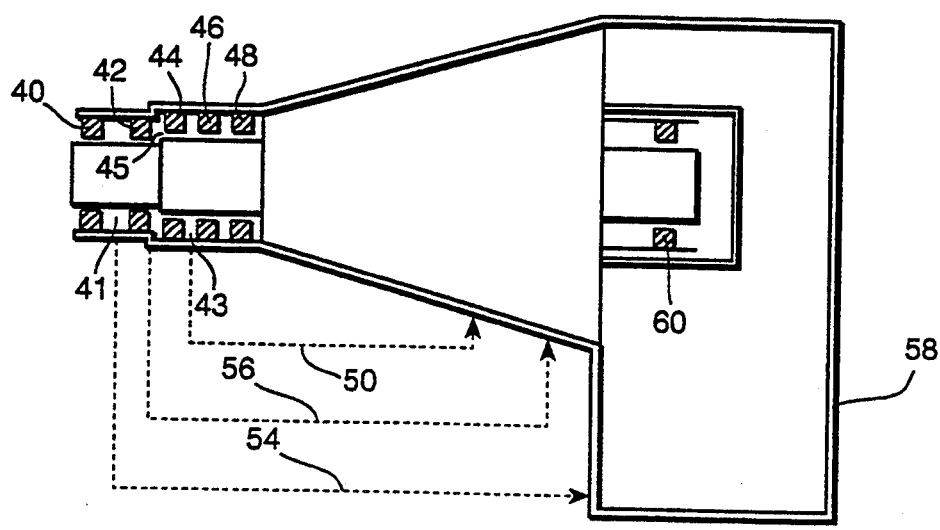
FIG. 2 is a schematic illustration similar to FIG. 1 and illustrating a shaft sealing system with a combination of labyrinth and segmented circumferential seals according to the present invention.
Figure 3:
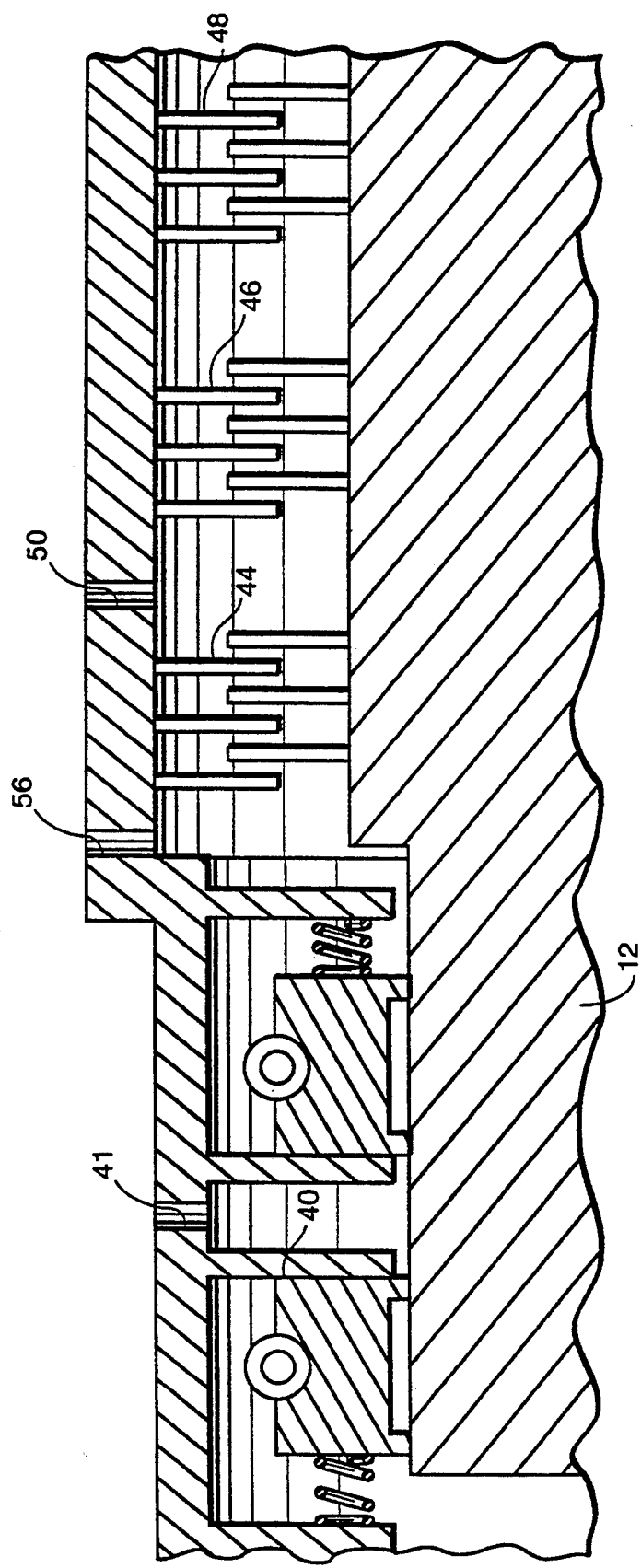
FIG. 3 is an enlarged fragmentary cross-sectional view of the shaft sealing system at the high-pressure end of the turbine.

Referring now to FIG. 2 and 3, the shaft sealing system illustrated in FIG. 2 includes the same general arrangement of the turbine, a rotary member 30 including a turbine shaft 32 and a second stationary member 34 surrounding 'the first member and at the high-pressure inlet end of the turbine, an outer air seal ring 40, an outer steam seal ring 42 and a plurality of axially spaced labyrinth seals 44, 46 and 48. The labyrinth seals 44, 46, and 48 are conventional and, as illustrated in FIG. 3, each comprise intermeshing teeth on the stationary and rotating elements affording a tortuous path for leakage steam flow and hence restricting the steam flow leakage. Both the air seal 40 and the outer steam seal 42 comprise segmented circumferential seals of known construction per se, for example, seals of the type described and illustrated in U.S. Pat. No. 4,082,296 incorporated herein by reference. Because the segmented circumferential air seal 40 has such low leakage rate only a very minimum amount of air passes across seal 40 into the annulus 41 between seals 40 and 42. From a review of FIG. 2, it will be appreciated that there is provided an annulus 43 between labyrinth seals 44 and 46, which is tapped off via piping 50 for delivery of steam to a stage in the turbine, similarly as in the conventional shaft sealing system using wholly labyrinth seals previously described with respect to FIG. 1. However, the annulus between the labyrinth seal 44 and the segmented circumferential outer steam seal 42 establishes an upstream pressure on the outer steam seal Because there is a limit with respect to the pressure differential that the outer steam seal 42 can tolerate, there is established a predetermined pressure in annulus 45 by passing steam (leaking outwardly past labyrinth seals 44, 46, and 48) through piping 56 into a predetermined stage of the turbine downstream of the stage coupled to the first leak-off 50. The opposite side of seal 42 is, of course, at the condenser vacuum pressure via line 54, coupled with the main condenser 58. As a consequence of this arrangement, the outer steam seal 42 will leak a small amount of steam into the annulus 41 between the air seal 40 and steam seal 42. The air/steam vent 54 thus conducts combined leakage air/steam to the main condenser 58.

At the low-pressure end of the turbine, a single segmented circumferential air seal 60 is provided. Any air leaking past this seal enters the turbine exhaust hood and flows to main condenser 58. No piping is required at this end.

It will be appreciated that the combination segmented circumferential seal and labyrinth seal system as described can be applied to condensing steam turbines as well as to non-condensing and multiple casing steam turbines.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. In a multi-stage steam turbine having a first rotating member including a shaft, a second stationary member surrounding said first member and defining a steam flow path having a high-pressure inlet at one end of the turbine and a low-pressure outlet at its opposite end, a shaft sealing system adjacent the inlet and outlet ends of said turbine, comprising:

a pair of axially spaced labyrinth seals about said shaft adjacent said high-pressure inlet end and defining an annulus therebetween;

a pair of axially segmented circumferential seals about and contacting said shaft defining an annulus therebetween and spaced axially outwardly of said labyrinth seals;

an axially outermost segmented circumferential seal of said pair of segmented circumferential seals constituting an air seal sealing between ambient and the annulus between said segmented circumferential seals;

another of said pair of segmented circumferential seals constituting an outer steam seal sealing between said labyrinth seals and the annulus between said segmented circumferential seals, means connecting the annulus between said labyrinth seals and a stage of said turbine for supplying steam leaked past an axially innermost one of said pair of labyrinth seals to a stage of said turbine;

segmented circumferential seal about said shaft adjacent the outlet end of said turbine for sealing between ambient and turbine exhaust flow; and said outer steam seal and an outermost of said pair of labyrinth seals defining an annulus therebetween and means connecting the latter annulus with another stage of said turbine downstream of the first-mentioned turbine stage.

2. In a multi-stage steam turbine having a first rotating member including a shaft, a second stationary member surrounding said first member and defining a steam flow path having a high-pressure inlet at one end of the turbine and a low-pressure outlet at its opposite end, a shaft system adjacent the inlet and outlet ends of said turbine, comprising:

a pair of axially spaced labyrinth seals about said shaft adjacent said high-pressure inlet end and defining an annulus therebetween;

a pair of axially spaced segmented circumferential seals about and contacting said shaft defining an annulus therebetween and spaced axially outwardly of said labyrinth seals;

an axially outermost segmented circumferential seal of said pair of segmented circumferential seals constituting an air seal sealing between ambient and the annulus between said segmented circumferential seals;

another of said pair of segmented circumferential seals constituting an outer steam seal sealing between said labyrinth seals and the annulus between said segmented circumferential seals;

means connecting the annulus between said labyrinth seals and a stage turbine for supplying steam leaked past an axially innermost one of said pair of labyrinth seals to a stage of said turbine;

segmented circumferential seal about said shaft adjacent the outlet end of said turbine for sealing between ambient and turbine exhaust flow; and said outer steam seal and an outermost one of said pair of labyrinth seals defining an annulus therebetween and means connecting the latter annulus with another stage of said turbine downstream of the first-mentioned turbine stage; and including a main condenser for recovering the turbine exhaust flow and means connecting the annulus between said segmented circumferential seals and the main condenser for flowing combined leakage air and steam leaking past the air seal and the outer steam seal, respectively.

3. A sealing system according to claim 2, wherein said outer steam seal and an outermost one of said pair of labyrinth seals define an annulus therebetween and means connecting the latter annulus with another stage of said turbine downstream of the first-mentioned turbine stage; and including a main condenser for recovering the turbine exhaust flow and means connecting the annulus between said segmented circumferential seals and the main condenser for flowing combined leakage air and steam leaking past the air seal and the outer steam seal, respectively.

* * * * *